US008248674B2

(12) United States Patent
Kurigata

(10) Patent No.: US 8,248,674 B2
(45) Date of Patent: *Aug. 21, 2012

(54) PIXEL INTERPOLATION APPARATUS, PIXEL INTERPOLATION METHOD AND IMAGE READING APPARATUS

(75) Inventor: Yuhei Kurigata, Hachioji (JP)

(73) Assignee: Konica Minolta Business Technologies, Inc. (JP)

(*) Notice: Subject to any disclaimer, the term of this patent is extended or adjusted under 35 U.S.C. 154(b) by 494 days.

This patent is subject to a terminal disclaimer.

(21) Appl. No.: 12/544,128

(22) Filed: Aug. 19, 2009

(65) Prior Publication Data

US 2010/0060949 A1 Mar. 11, 2010

(30) Foreign Application Priority Data

Sep. 5, 2008 (JP) ................................. 2008-228808

(51) Int. Cl.
H04N 1/04 (2006.01)

(52) U.S. Cl. ......... 358/474; 358/525; 358/514; 358/1.9; 382/167; 382/274; 348/276

(58) Field of Classification Search .................. 358/474, 358/1.9, 518, 525, 514; 382/235, 233, 300, 382/199, 167, 274; 348/276, E09.042
See application file for complete search history.

(56) References Cited

U.S. PATENT DOCUMENTS

| 6,754,402 | B2 * | 6/2004 | Matama ........................ 382/300 |
| 7,065,246 | B2 * | 6/2006 | Xiaomang et al. ............. 382/162 |
| 7,167,602 | B2 * | 1/2007 | Yamashita et al. ............. 382/300 |
| 7,292,725 | B2 * | 11/2007 | Chen et al. .................... 382/167 |
| 7,330,209 | B2 * | 2/2008 | Osamato ....................... 348/273 |
| 7,362,897 | B2 * | 4/2008 | Ishiga ........................... 382/167 |
| 7,412,092 | B2 * | 8/2008 | Nomura et al. ................ 382/162 |
| 7,652,700 | B2 * | 1/2010 | Takahashi et al. ............. 348/273 |
| 7,738,738 | B2 * | 6/2010 | Yamanaka et al. ............. 382/300 |
| 7,990,447 | B2 * | 8/2011 | Honda et al. .................. 348/294 |
| 8,000,563 | B2 * | 8/2011 | Yoshino et al. ................ 382/300 |
| 8,013,896 | B2 * | 9/2011 | Tachibana et al. .......... 348/208.5 |
| 2007/0092156 | A1 * | 4/2007 | Yamanaka et al. ............. 382/274 |
| 2007/0247530 | A1 * | 10/2007 | Takahasi et al. ............. 348/223.1 |

FOREIGN PATENT DOCUMENTS

JP 2005-117291 4/2005

* cited by examiner

Primary Examiner — Negussie Worku
(74) Attorney, Agent, or Firm — Squire Sanders (US) LLP

(57) ABSTRACT

A pixel interpolation apparatus including an interpolation section for calculating an estimation density value of a missing pixel from densities of peripheral pixels of the missing pixel; and a correction section for calculating a first average value which being an average density value of pixels in a first two-dimensional area containing the missing pixel whose density value is assumed to be the estimation density value calculated by the interpolation section and a second average value which being an average density value of a second two-dimensional area, located in a peripheral of the missing pixel, not containing the missing pixel, and for correcting the estimation density value of the missing pixel in the first two-dimensional area so that a difference between the first average value and the second average value becomes zero or small.

7 Claims, 14 Drawing Sheets

INTERPOLATION POSITION A

INTERPOLATION POSITION A

PIXEL INTERPOLATION APPARATUS, PIXEL INTERPOLATION METHOD AND IMAGE READING APPARATUS

CROSS REFERENCE TO RELATED APPLICATION

The present application is based on Japanese Patent Application No. 2008-228808 filed with Japanese Patent Office on Sep. 5, 2008, the entire content of which is hereby incorporated by reference.

BACKGROUND OF THE INVENTION

1. Technical Field

The present invention relates to a pixel interpolation apparatus, a pixel interpolation method and an image reading apparatus, which interpolate a missing pixel.

2. Description of Prior Art

A contact line image sensor (Contact Image Sensor, called CIS hereafter), which is used for an image reading apparatus for optically reading a document image, is configured so that a plurality of sensor chips arranged in series share the reading length of one line. At the connecting section of the sensor chips, there is a section in which an image sensor of approximately one pixel does not exist because of the physical constraint. One missing pixel, which cannot be read as an image, is generated. For example, FIG. 13a illustrates a state in which a diagonal line is read by a section without a missing pixel. However, in case when the same diagonal line is read by a section with a missing pixel, pixels marked with "x" become missing as illustrated in FIG. 13b. In FIGS. 13a, 13b and 13c, a white circle represents an existing white pixel, a black circle represents an existing black pixel and a symbol "x" represents a missing pixel.

In case when image data outputted by the contact line image sensor, in which such missing pixel is generated, is used without considering the generation of missing pixel, an affected streak occurs in the missing pixel section as illustrated in FIG. 13c. Therefore, the missing pixel is interpolated by a method for maintaining the continuity with the peripheral pixel in one-dimensional direction (for example, the line direction of the contact line image sensor), and the streak is made less visible.

For example, there is an interpolation method (for example, refer to Unexamined Japanese Patent Application Publication No. 2005-117291: JPA2005-117291) that sets an interpolation value of a missing pixel so that an average value of a predetermined range in one-dimensional direction containing the missing pixel (for example, the missing pixel and one pixel each from left and right of the missing pixel in the direction of the reading line of the line image sensor) and an average value of the predetermined range in one-dimensional direction in the peripheral of the missing pixel not containing the missing pixel (for example, three pixels from left and right that sandwich the missing pixel in the direction of the reading line of the line image sensor) equal with each other.

With respect to a method that calculates the interpolation value of the missing pixel from the peripheral pixels in one-dimensional direction, in case when an image has a periodicity caused by a screen pattern of two-dimensional area (for example, 4×4) just as a screen image (halftone dot image), moire of an affected streak is generated and a remarkable degradation of image quality can occur. For example, FIG. 14 illustrates an image onto which a process of interpolating the missing pixel included in the screen image with peripheral pixels in the horizontal direction has been performed. The affected moire has occurred in the interpolation position A.

In the interpolation method disclosed in JPA2005-117291 which is arranged to determine the density of the missing pixel so that the average density of the predetermined range containing the missing pixel and the average density of the predetermined range of the peripheral of the missing pixel not containing the missing pixel equal with each other, the method attempts to correspond to the periodicity of the screen pattern by widening the predetermined range and selecting the size of the predetermined range. However, in such interpolation method, only one missing pixel having an unfixed density can be included in the predetermined range that contains the missing pixel.

Namely, in case when two or more missing pixels having unsettled values are included in the predetermined range, the densities of a plurality of missing pixels cannot be individually determined only with a condition that the density average value of an area containing the missing pixel and the density average value of an area not containing the missing pixel are made equal to each other. This plurality of the missing pixels must be interpolated with the same density. Thus, the optimal interpolation cannot be performed. Therefore, in the interpolation method of JPA2005-117291, since the predetermined range for calculating the average value is limited to one-dimensional area, it was difficult to suitably interpolate corresponding to the periodicity of the screen pattern expanded to two-dimension. In case when one-dimensional predetermined range is expanded, a pixel at the end of the predetermined range becomes distant from the missing pixel when compared with the case in which the density is calculated with the two-dimensional area having the same number of pixels. Therefore, the relevance of the pixels in the predetermined range and the missing pixel becomes weak and the pixels in the predetermined range become undesirable as the peripheral pixel for presuming the density of the missing pixel.

The present invention is to solve the above mentioned problem. An object of the present invention is to provide a pixel interpolation apparatus, a pixel interpolation method and an image reading apparatus, which are capable of interpolating a missing pixel with natural connection even in case when the process is applied to a screen image.

SUMMARY

A pixel interpolation apparatus reflecting one aspect of the present invention to attain the above-mentioned object includes:

an interpolation section for calculating an estimation density value of a missing pixel from densities of peripheral pixels of the missing pixel; and a correction section for calculating a first average value which being an average density value of pixels in a first two-dimensional area containing the missing pixel whose density value is assumed to be the estimation density value calculated by the interpolation section and a second average value which being an average density value of a second two-dimensional area, located in a peripheral of the missing pixel, not containing the missing pixel, and for correcting the estimation density value of the missing pixel in the first two-dimensional area so that a difference between the first average value and the second average value becomes zero or small.

A pixel interpolation apparatus reflecting another aspect of the present invention further includes:

a determination section for determining whether a peripheral area of the missing pixel is a screen image area, wherein, with respect to the missing pixel whose peripheral area has been determined to be the screen image area by the determination section, a corrected value obtained in the correction section by correcting the estimation density value calculated by the interpolation section is set to be a density value of the missing pixel, and with respect to the missing pixel whose peripheral has been determined not to be the screen image area by the determination section, the estimation density value calculated in the interpolation section is set to be the density value of the missing pixel.

In the above-mentioned interpolation apparatus, the estimation value calculated in the interpolation section is used as the density value of the missing pixel in case when the missing pixel does not exist in the screen image area, and the value corrected by the correction section is used as the density of the missing pixel in case when the missing pixel exists in the screen image area.

According to a pixel interpolation apparatus reflecting another aspect of the present invention, the correction section is further configured to multiply the difference between the first average value and the second average value by a pixels number contained in the first two-dimensional area to get a multiplied value, to distribute the multiplied value onto one or a plurality of missing pixels in the first two-dimensional area, and to add the distributed value onto the estimation density value of the missing pixel where the multiplied value is distributed, as an operation to correct the estimation density value of the missing pixel in the first two-dimensional area so that the difference between the first average value and the second average value becomes zero or small.

An image reading apparatus reflecting another aspect of the present invention includes: a reading section having a line image sensor in which a plurality of sensor chips are arranged in series to have a reading area corresponding to a plurality of pixels aligned in one-dimensional prescribed direction, and at a boundary of each one and the another of the plurality of sensor chips a missing pixel is generated, wherein the reading section optically reads a two-dimensional image of an original document by relatively moving the original document and the line image sensor; and a pixel interpolation apparatus for interpolate a missing pixel in image data obtained through reading the original document by the reading section, the pixel interpolation apparatus comprising, an interpolation section for calculating an estimation density value of a missing pixel from densities of peripheral pixels of the missing pixel, and a correction section for calculating a first average value which being an average density value of pixels in a first two-dimensional area containing the missing pixel whose density value is assumed to be the estimation density value calculated by the interpolation section and a second average value which being an average density value of a second two-dimensional area, located in a peripheral of the missing pixel, not containing the missing pixel, and for correcting the estimation density value of the missing pixel in a first two-dimensional area so that a difference between the first average value and the second average value becomes zero or small.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

Hereafter, each embodiment of the present invention will be described in reference to drawings.

First Embodiment

Figure 1:
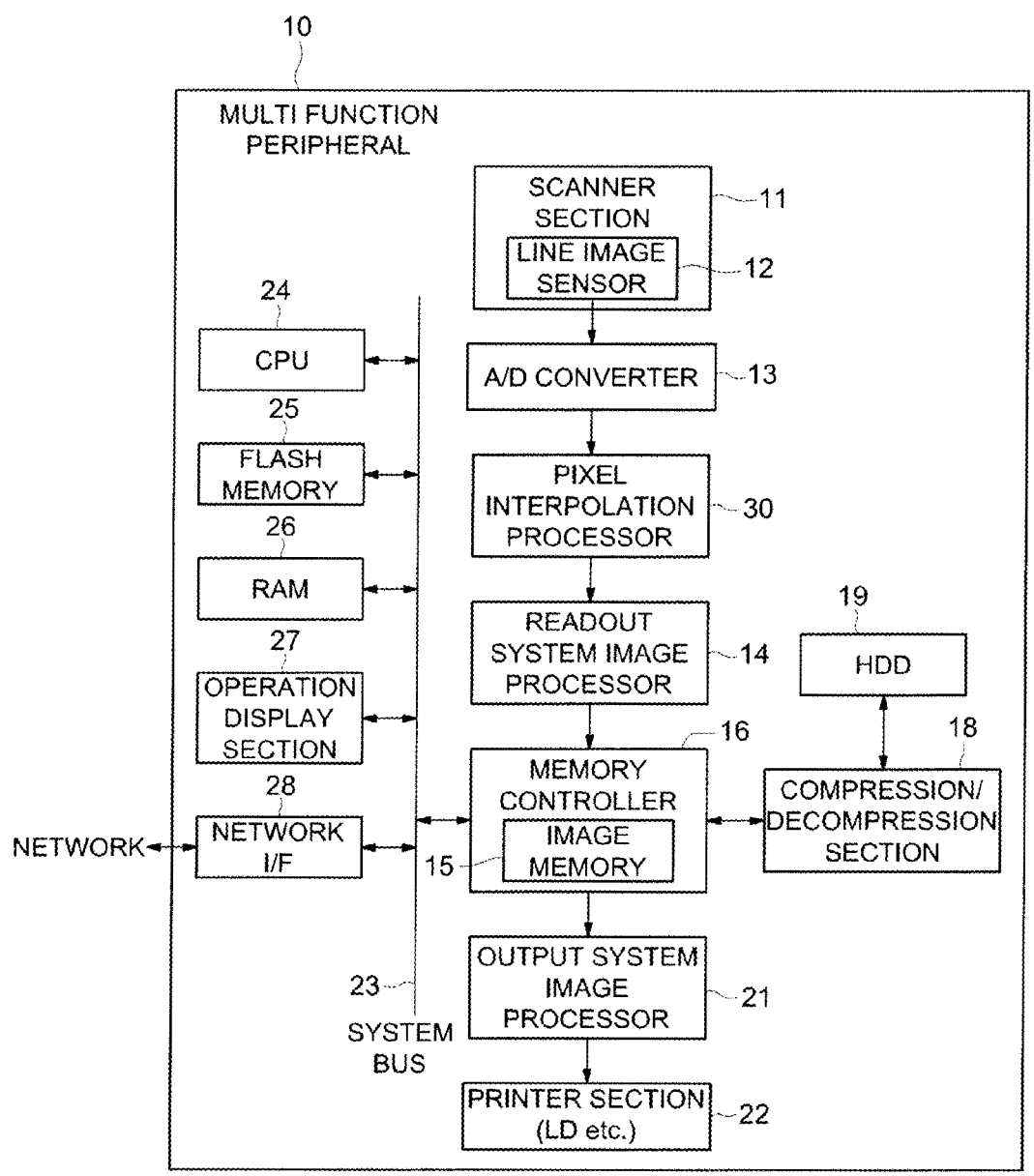
FIG. 1 illustrates a block diagram showing a configuration of a digital multi function peripheral pertaining to an embodiment of the present invention.

FIG. 1 illustrates a block diagram showing an outline configuration of a digital multi function peripheral 10 that has a function of an image reading apparatus pertaining to a first embodiment of the present invention. The digital multi function peripheral 10 has a copy function for forming and printing out a duplicate of an image, which has been obtained by optically reading a document, onto a recording sheet, a scanning function for outputting and storing the read document image as a file, and a printer function for forming and outputting the image onto a sheet based on print data received from an external terminal.

The digital multi function peripheral 10 is configured by a scanner section 11 for optically reading a document and acquiring image data, an A/D converter 13 for quantizing and converting analog image data outputted from a contact line image sensor 12 included in the scanner section 11 to digital image data, a pixel interpolation processor 30 for inputting the image data outputted from the A/D converter 13 and for interpolating a missing pixel in the read image of the line image sensor 12, a readout system image processor 14 for performing a various kinds of image processing to the interpolated image data outputted from the pixel interpolation processor 30, a memory controller 16 for controlling a read/write of data for the image memory 15, a compression/decompression section 18 for performing a compression and a decompression of the image data, a hard disk drive (HDD) 19 for storing the image data compressed or decompressed by the compression/decompression section 18, an output system image processor 21 for performing a various image processing for a print output to the image data and a printer section 22 for forming an image on the recording sheet based on the image data outputted from the output system image processor 21 and printing out.

Further, the digital multi function peripheral 10 includes a system bus 23 configured by a PCI (Peripheral Component Interconnect) bus. This system bus 23 is connected to a CPU (Central Processing Unit) 24, which totally controls the digital multi function peripheral 10, a flash memory 25, which memorizes a various kinds of data and programs executed by the CPU 24 into a non-volatile and rewritable form, a RAM (Random Access Memory) 26, which is used as a work memory that temporarily stores a various kinds of data when the CPU 24 executes a program, an operation display section 27, a network I/F section 28 and the above-mentioned memory controller 16.

The operation display section 27 is configured by a various kinds of operation switches and a liquid crystal display whose surface is equipped with a touch panel. The operation display section 27 has a function to display a various kinds of guidance displays and status displays to a user, or to receive a various kinds of operations from the user.

The network I/F section 28 is connected to a network, such as LAN (Local Area Network), to perform an exchange of data with an external apparatus.

Figure 2:
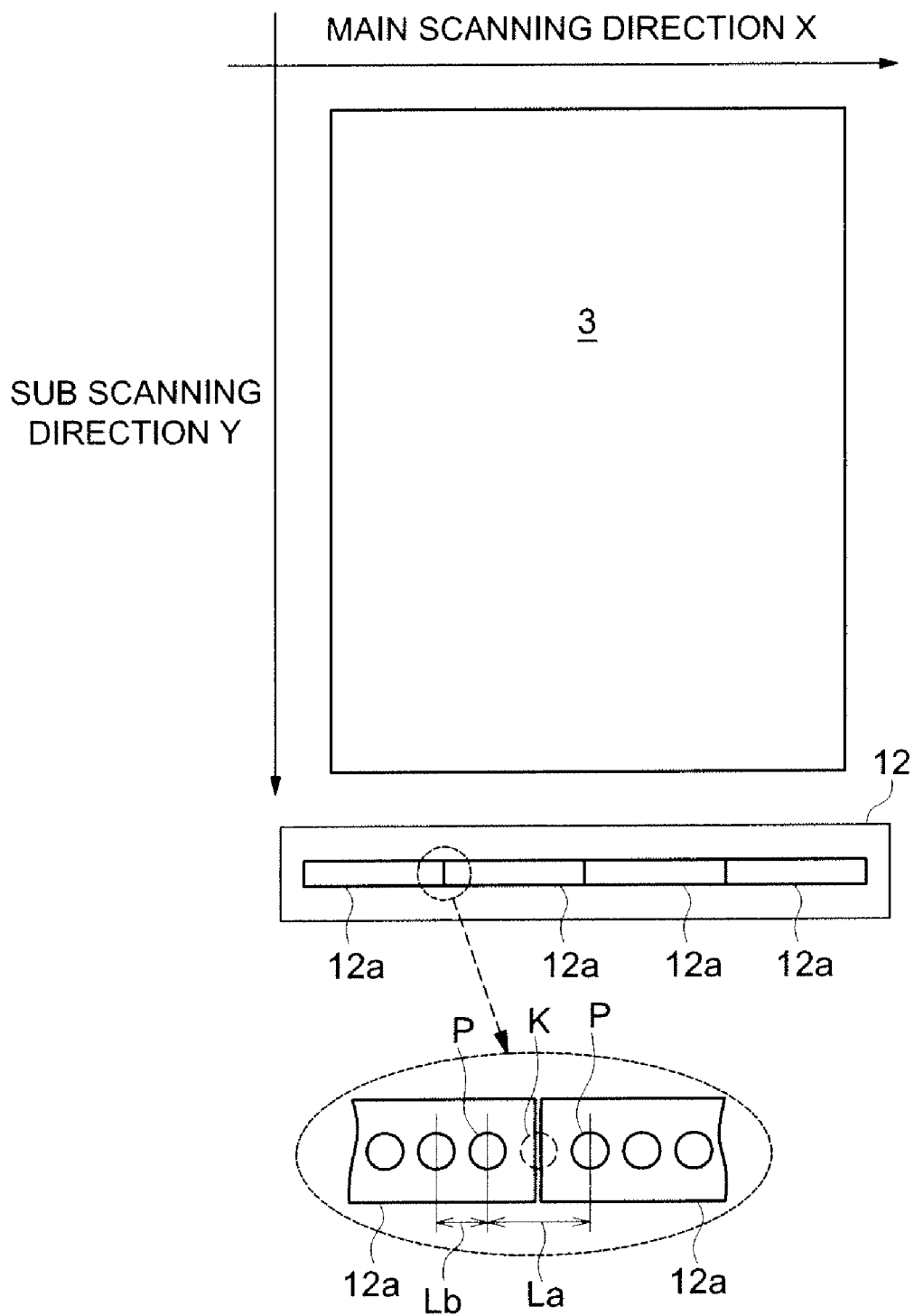
FIG. 2 illustrates an explanatory view showing relations of a main scanning direction, a sub scanning direction and a line image sensor, which is configured by a plurality of sensor chips.

A document to be read is conveyed by an un-illustrated automatic document feeder. Then the scanner section 11 reads the document image two-dimensionally with a so-called through reading method using the contact line image sensor 12 disposed in the middle of the convey path. That is, as illustrated in FIG. 2, the line image sensor 12 is provided with a reading area that corresponds to one line in a main scanning direction (X). A conveyance direction of a document 3 is set to a sub scanning direction (Y), which is orthogonal to the main scanning direction (X). The line image sensor 12 reads the document 3 as a two-dimensional image by repeatedly performing a reading operation in line unit when the document 3 passes through a light receiving section of the line image sensor 12. The document 3 and the line image sensor need to relatively move in the sub scanning direction. The line image sensor 12 may also be arranged so to move in the sub scanning direction while the document 3 is placed on a platen glass.

The line image sensor 12 is configured by a plurality of sensor chips 12a, which is provided with a reading area corresponding to a plurality of pixels arranged in a one-dimension in the main scanning direction. The plurality of sensor chips 12a is arranged in series in the main scanning direction. On a boundary between sensor chips 12a, an interval La of read-in pixels P disposed on both sides of the boundary as to sandwich the boundary is set to be longer than a pixel pitch Lb of each sensor chip 12a (about twice the pixel pitch Lb). One pixel becomes missing in this boundary section (this missing pixel is set to a missing pixel "K").

The description of the embodiment continues by returning to FIG. 1. The readout system image processor 14 performs an image processing, such as a various kinds of filter processing, to the interpolated image data outputted from the pixel interpolation processor 30.

The memory controller 16 manages and controls the exchange of data among the readout system image processor 14, the image memory 15, the compression/decompression section 18, the output system image processor 21 and the system bus 23. Precisely, the memory controller 16 has functions to input the image data outputted from the readout system image processor 14, to give an address signal and a timing signal to the image memory 15, to control a write-in and read-out of data to the image memory 15, to exchange data with the compression/decompression sections 18, to output image data memorized in the image memory 15 to the output system image processor 21 and to exchange image data and control data with the system bus 23 side.

The output system image processor 21 performs image processing, such as gamma conversion, frequency conversion and PWM conversion, to the image data from the memory controller 16. The output system image processor 21 also performs a timing control in which image data is synchronized with the timing signal from the printer section 22 and the image data is sequentially sent out to the printer section 22.

The printer section 22 forms an image that corresponds to the image data inputted from the output system image processor 21 onto a recording sheet using an electro photography process, and outputs the recording sheet. The printer section 22 is configured as a so-called laser beam printer that has a conveyance apparatus of a recording sheet, a photoreceptor drum, a charging apparatus, a laser unit, a development device, a transfer separation device, a cleaning device and a fixing device. The printer section 22 may be a printer of the other method.

In this digital multi function peripheral 10, for example, in case when executing a copy job that copies a document, a reading operation and an output operation are performed. In the reading operation, a document is read by the scanner section 11. The interpolation of a missing pixel is performed by the pixel interpolation processor 30 against the read-in image data. The interpolated image data is processed by the readout system image processor 14. After the image data is compressed by the compression/decompression section 18, or while the image data is still in a decompressed state, the image data is memorized to the image memory 15 or to the hard disk drive 19. In the output operation, the memorized image data is sequentially read-out from the image memory 15 or the hard disk drive 19. In case when the image data is decompressed, the image data is left as it is. In case when the image data is compressed, the image data is decompressed by the compression/decompression section 22. Then the image data processed by the output system image processor 21 is outputted to the printer section 22. The printer section 22 forms the image corresponding to the image data onto a recording sheet and prints out.

Figure 3:
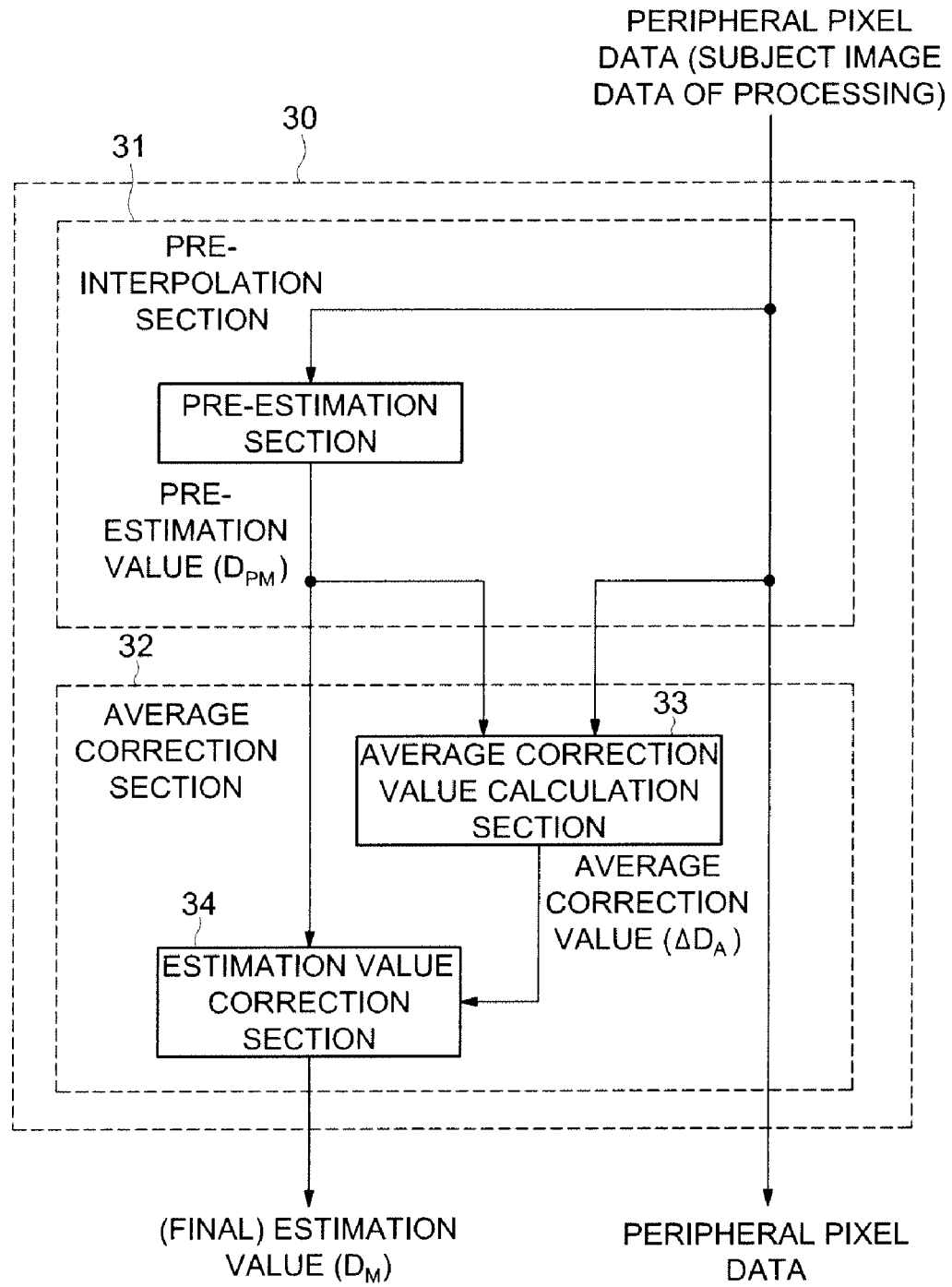
FIG. 3 illustrates a block diagram showing a configuration of a pixel interpolation processor pertaining to a first embodiment of the present invention.

FIG. 3 illustrates a configuration of the pixel interpolation processor 30 that interpolates the missing pixel of the reading image caused by the line image sensor 12. The pixel interpolation processor 30 includes a pre-interpolation section 31 and an average correction section 32. The image data to be processed that was read and obtained by the line image sensor 12 of the scanner 11 is inputted to the pre-interpolation section 31. The image data to be processed is image data with multiple gradations in which each pixel is expressed with a plurality of gradations. For example, one pixel is expressed with 256 gradations.

The pre-interpolation section 31 has a function for acquiring the image data to be processed (peripheral pixel data) that was read and obtained by the line image sensor 12 of the scanner section 11 and for computing an estimation value (this is set to be a pre-estimation value) of the density of the missing pixel (also called an interpolation pixel) using peripheral pixels in the one-dimensional direction of the missing pixel as reference pixels.

The average correction section 32 obtains a first average value, which is an average value of the density of the pixel in the first two-dimensional area containing the missing pixel that has the pre-estimation value calculated in the pre-interpolation section 31 as a density value, and a second average value, which is an average value of the density in the second two-dimensional area in the peripheral of the missing pixel but not containing the missing pixel. Then the average correction section 32 corrects the pre-estimation value so that the difference between the first average value and the second average value becomes zero or little (the first average value and the second average value become equal to each other or approximately equal to each other).

In the pixel interpolation processor 30, for example, the position information that indicates how many pixels are there from the foremost of one line to the position where the missing pixel is located is given from the CPU 24 or is set up in advance. The pixel interpolation processor 30 estimates the density value of the missing pixel by presuming that the missing pixel exists in the position indicated by the position information. The pixel interpolation processor 30 inserts the image data (image data of the missing pixel) of one pixel having this estimated density value into the corresponding position (position of the missing pixel indicated by the position information) within the inputted image data (peripheral pixel data). Then the pixel interpolation processor 30 outputs the image data to the readout system image processor 14 of the latter steps.

Hereafter, the operations of the pre-interpolation section 31 and the average correction 32 will be described more in detail.

Figure 4:
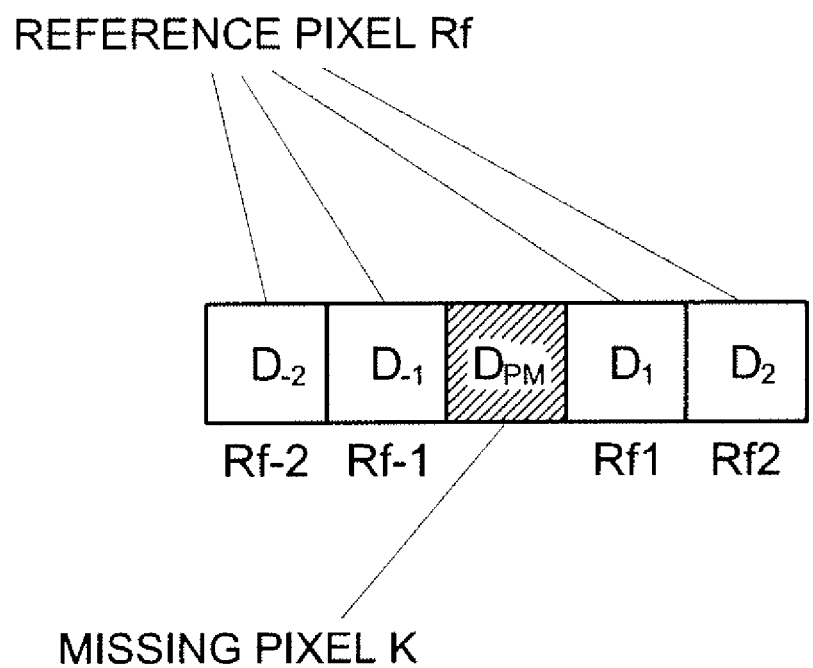
FIG. 4 illustrates an explanatory view showing a relation of a reference pixel and a missing pixel in one-dimensional interpolation.

The pre-interpolation section 31 estimates the density value (pre-estimation value DPM) of the missing pixel by setting a plurality of peripheral pixels in the one-dimensional direction (for example, the main scanning direction) of the missing pixel as reference pixels. For example, in case when four peripheral pixels in the main scanning direction are set as the reference pixels, as illustrated in FIG. 4, reference pixels Rf (Rf$_{-2}$, Rf$_{-1}$, Rf$_1$, Rf$_2$) are arranged so as to sandwich the missing pixel K with two pixels on both sides. Then, the pre-estimation value (D$_{PM}$) is calculated according to the operation shown in the following equation (1).

$$D_M = C_{-2}D_{-2} + C_{-1}D_1 + C_1D_1 + C_2D_2 \qquad \text{Equation (1)}$$

Here, each of C$_{-2}$, C$_{-1}$, C$_1$ and C$_2$ is a weighting factor. D$_{-2}$, D$_{-1}$, D$_1$ and D$_2$ are the density values of the peripheral pixel. For example, when the spline method that presumes to maintain the continuity of the reference pixels is used, each of the weighting factors becomes as follows.

$$\{C_{-2}, C_{-1}, C_1, C_2\} = \{-0.1875, 0.6875, 0.6875, -0.1875\}$$

Figure 5:
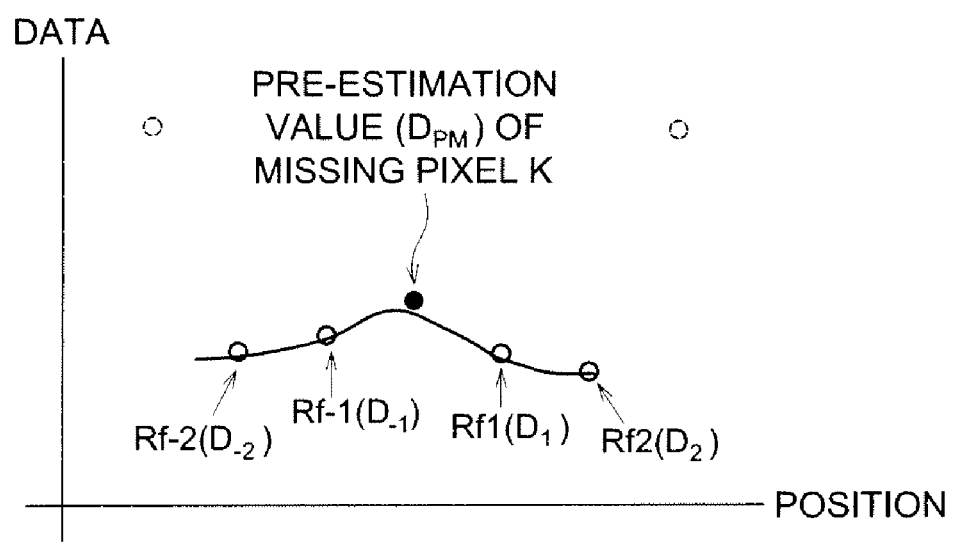
FIG. 5 illustrates an explanatory view showing an example of a processing result of a pre-interpolation.

In case when the spline method is used, for example, as illustrated in FIG. 5, the pre-estimation value is determined.

A pre-interpolation method is not limited to the above-mentioned spline method. The pre-interpolation method may be any interpolation method as long as it is a method that estimates the density from the density value of existing pixel. The reference pixels are not limited to pixels in the main scanning direction. The pre-estimation value of the missing pixel may be calculated from the peripheral pixels on the left diagonal line, the right diagonal line or both of the left and right diagonal lines.

The average correction section 32 corrects the pre-estimation value calculated by the pre-interpolation section 31. In a line image or a natural image, the pre-estimation value calculated by the pre-interpolation section 31 can be interpolated to create an image with natural connection. However, in a screen image (halftone dot image), the continuity with peripheral pixels is remarkably low. Further, since the screen image has a fixed pattern (periodicity), the density unevenness of affected streak occurs in an interpolation pixel section in the sub scanning direction. The average correction section 32 corrects the pre-estimation value so that this density unevenness is dissolved.

The average correction section 32 is configured by an average correction value calculation section 33 and an estimation value correction section 34 as illustrated in FIG. 3. The average correction value calculation section 33 obtains the first average value, which is an average value of the density of the pixel in the first two-dimensional area containing the missing pixel that has the estimation value calculated in the pre-interpolation section 31 as a density value, and the second average value, which is an average value of the density in the second two-dimensional area in the peripheral of the missing pixel but not containing the missing pixel. Further, the average correction value calculation section 33 calculates the average value (average value difference $\Delta D_A$) of the difference between the first average value and the above-mentioned second average value.

Figure 6:
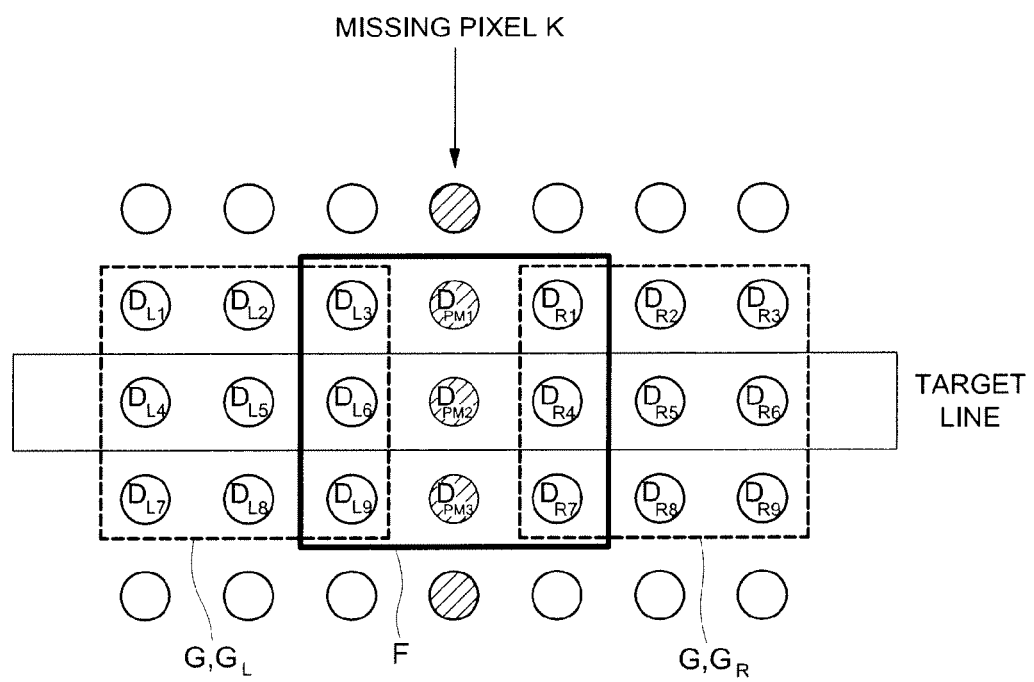
FIG. 6 illustrates an explanatory view showing an example of a first two-dimensional area including missing pixels, and second two-dimensional areas not including the missing pixels.

Here, as illustrated in FIG. 6, a square matrix of 3 pixels×3 pixels containing the missing pixels is set as a first two-dimensional area "F". A second two-dimensional area "G" that does not contain a missing pixel is configured by two square matrices G$_L$ and G$_R$, which are 3 pixels×3 square matrices, and the two square matrices G$_L$ and G$_R$ are arranged on the left and right of the missing pixels, respectively. A white circle of FIG. 6 represents a pixel (peripheral pixel) that actually exists. A circle with slashes in FIG. 6 represents the missing pixel "K". With respect to the operation of the average correction value calculation section 33, the pre-estimation value computed by the pre-interpolation section 31 is used as the density of each missing pixel K.

A first average value A$_M$ being the average value of the densities of the nine pixels contained in the first two-dimensional area "F", an average value A$_R$ of the density of the square matrix G$_R$ and an average value A$_L$ of the density of the square matrix G$_L$ are expressed with the following equations, respectively.

$$A_M = (D_{PM1} + D_{PM2} + D_{PM3} + D_{L3} + D_{L6} + D_{L9} + D_{R1} + D_{R4} + D_{R7})/9$$

$$A_L = (D_{L1} + D_{L2} + D_{L3} + D_{L4} + D_{L5} + D_{L6} + D_{L7} + D_{L8} + D_{L9})/9$$

$$A_R = (D_{R1} + D_{R2} + D_{R3} + D_{R4} + D_{R5} + D_{L6} + D_{R7} + D_{R8} + D_{R9})/9$$

Here, "D" having a subscript represents the density of the pixel of the position indicated by the subscript.

The average correction section 32 calculates the average value difference $\Delta D_A$, which is the difference between the average values of $A_L$ and $A_R$, and $A_M$, after the above mentioned $A_M$, $A_L$ and $A_R$ have been calculated.

$$\Delta D_A = A_M - (A_L + A_R)/2$$

Further, the average correction value calculation section 33 calculates the average correction value ($\Delta D_{AC}$) from the average value difference ($\Delta D_A$). The average correction value $\Delta D_{AC}$ indicates the total required correction value within a matrix (first two-dimensional area "F"). Here, since the first two-dimensional area "F" is a 3×3 pixel matrix, $$\Delta D_{AC} = 9\Delta D_A$$

Thus, the average correction value $\Delta D_{AC}$ becomes nine times the average value difference ($\Delta D_A$).

Figure 7:
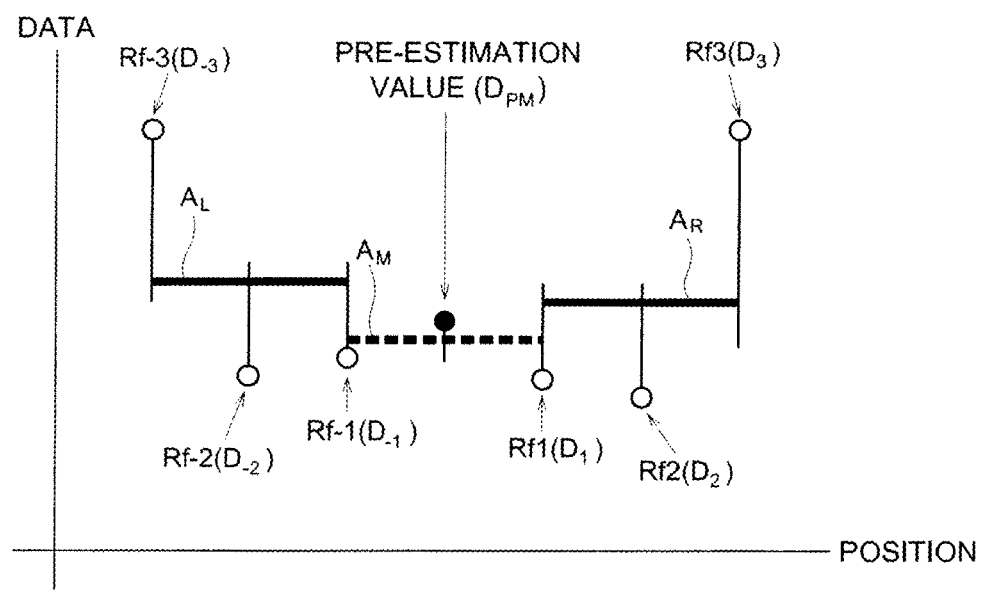
FIG. 7 illustrates an explanatory view showing relations of a pre-estimation value, an average value of density of the first two-dimensional area including the pre-estimation value, an average value of density of a left square matrix $G_L$ of the second two-dimensional areas, an average value of density of a right square matrix $G_R$ of the second two-dimensional areas and a position of each pixel.

FIG. 7 illustrates an example of relations of the pixel position with the pre-estimation value ($D_{PM}$), the average value $A_M$ of the density of the first two-dimensional area "F" that contains the pre-estimation value, the average value $A_L$ of the density of the square matrix $G_L$ that is the left side matrix of the second two-dimensional area "G" and the average value $A_R$ of the density of the square matrix $G_R$ that is the right side matrix of the second two dimensional area "G".

In the relation with pixels ($Rf_{-2}$ to $Rf_2$) used for the pre-interpolation, the pre-estimation value creates a natural connection of the density by the spline method. However, in the relation with a more expanded two-dimensional areas (F, $G_R$, $G_L$), since a density $A_M$ of the first two-dimensional area "F" is lower than the densities $A_L$ and $A_R$ of the peripheral, the natural connection of the density is not realized.

Figure 8:
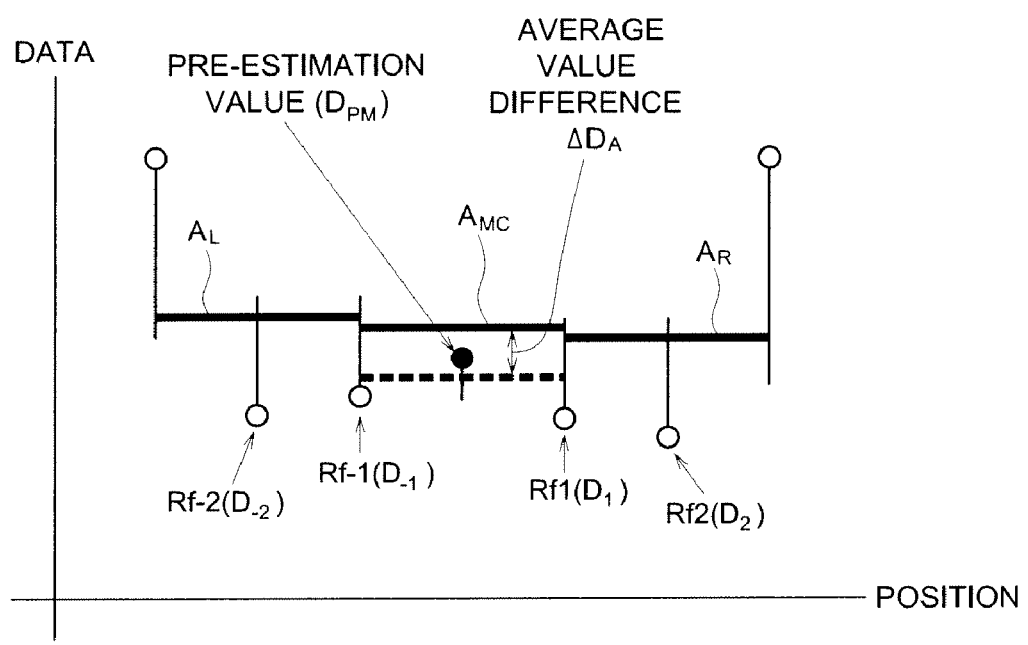
FIG. 8 illustrates an explanatory view showing an average value difference, which is the difference between an average value of density of the first two-dimensional area that includes the pre-estimation value and an average between the average value of density of the left square matrix $G_L$ and the average value of density of the right square matrix $G_R$ of the second two-dimensional areas.

In a case of the screen image, the density is expressed based on a unit of a fixed range area (screen pattern). Therefore, it is preferable to determine the density of the missing pixel so that the connection of density is secured in case when the two-dimensional area of a screen pattern is set as a unit. That is, as illustrated in FIG. 8, an average density $A_M$ of the first two-dimensional area "F" needs to be set to an average value density $A_{MC}$ ($A_{MC} = (A_L + A_R)/2$), which is the average density of the average value $A_L$ of the density of the square matrix $G_L$ of the left square matrix of the second two-dimensional area "G" and the average value $A_R$ of the density of the square matrix $G_R$ of the right square matrix of the second two-dimensional area "G".

The previously calculated $\Delta D_A$ is a correction amount of one pixel needed for setting the average density $A_M$ of the first two-dimensional area to the average value density $A_{MC}$. Since there are nine pixels in the whole first two-dimensional area "F", the correction of $\Delta D_{AC} = 9\Delta D_A$ needs to be performed.

Then, the estimation value correction section 34 obtains a final estimation value $D_M$ in which the pre-estimation value has been corrected by equally distributing the average correction value computed by the average correction value calculation section 33 to the pre-estimation value of three missing pixels that exist in a matrix (first two-dimensional area "F").

In detail, the pre-estimation value of each missing pixel is corrected as follows, and is set to the final estimation value $D_M$.

$$D_M = D_{PM} + \Delta D_{AC(-1)}/9 + \Delta D_{AC(0)}/9 + \Delta D_{AC(+1)}/9$$

Figure 9:
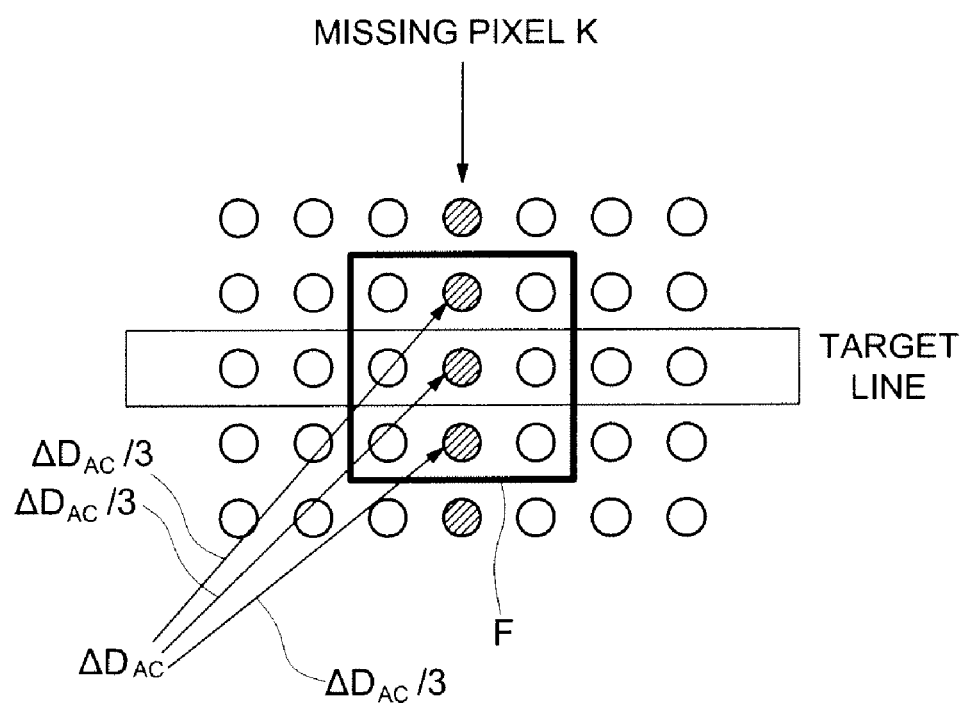
FIG. 9 illustrates in simulation an explanatory view showing a state in which an average correction value is distributed to the pre-estimation value of each missing pixel.
Figure 10:
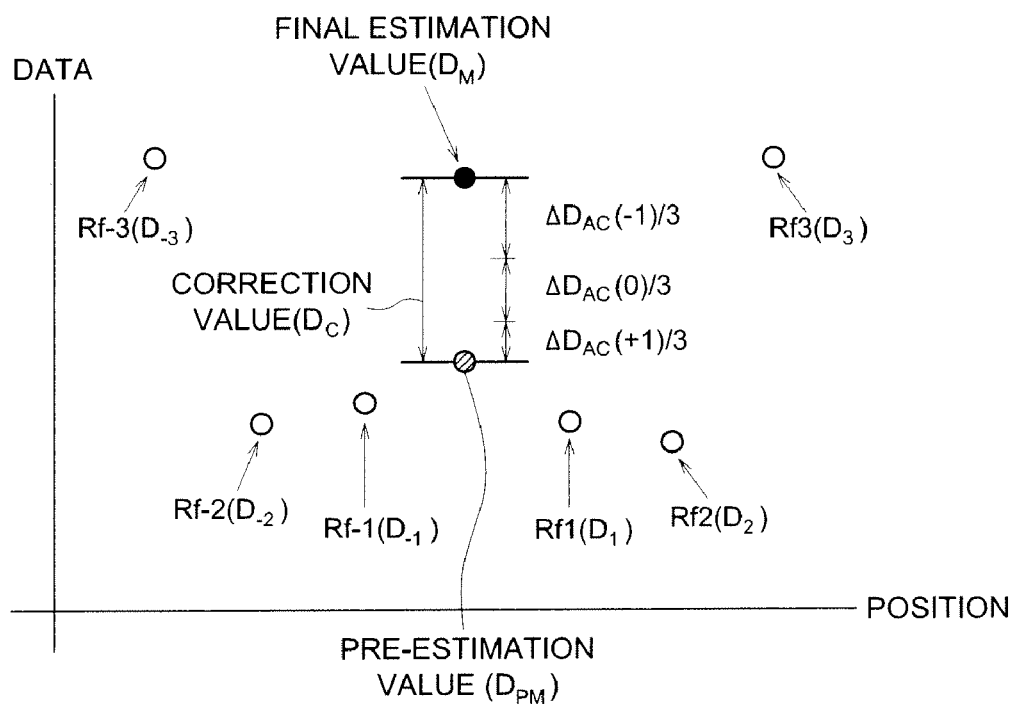
FIG. 10 illustrates an explanatory view showing a derivation of a final estimation value.

Here, $\Delta D_{AC(-1)}$ is the average correction value when one line after the target line is set as the target line, $\Delta D_{AC(0)}$ is the average correction value when the present target line is set as the target line, $\Delta D_{AC(+1)}$ is the average correction value when one line in front of the target line is set as the target line. FIG. 9 illustrates a distribution state. FIG. 10 illustrates the derivation of the final estimation value in simulation.

Other than equally distributing $\Delta D_{AC}$ to all of the missing pixels (three pixels) within the first two-dimensional area "F", the pre-estimation value may be corrected by reflecting $\Delta D_{AC}$ only to the missing pixel of the target line.

Figure 11:
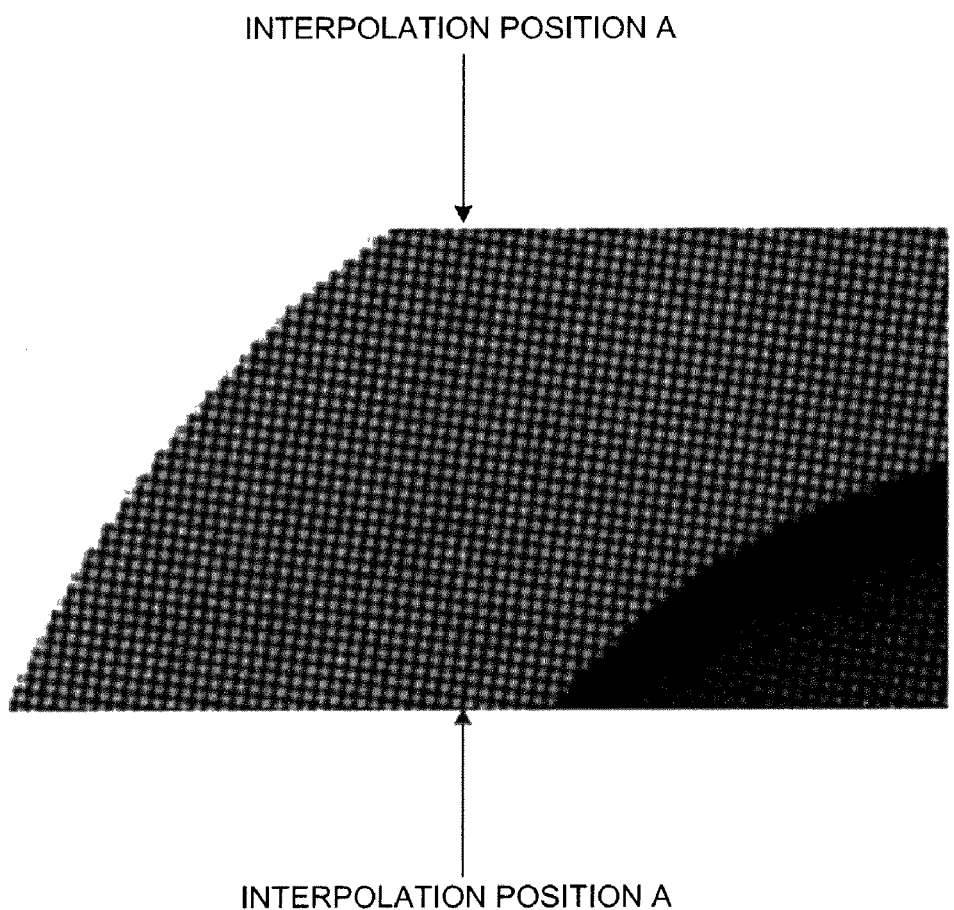
FIG. 11 illustrates an explanatory view showing an example of a screen image resulting from the pixel interpolation processor pertaining to the present invention performing an interpolation process of the missing pixel.
Figure 14:
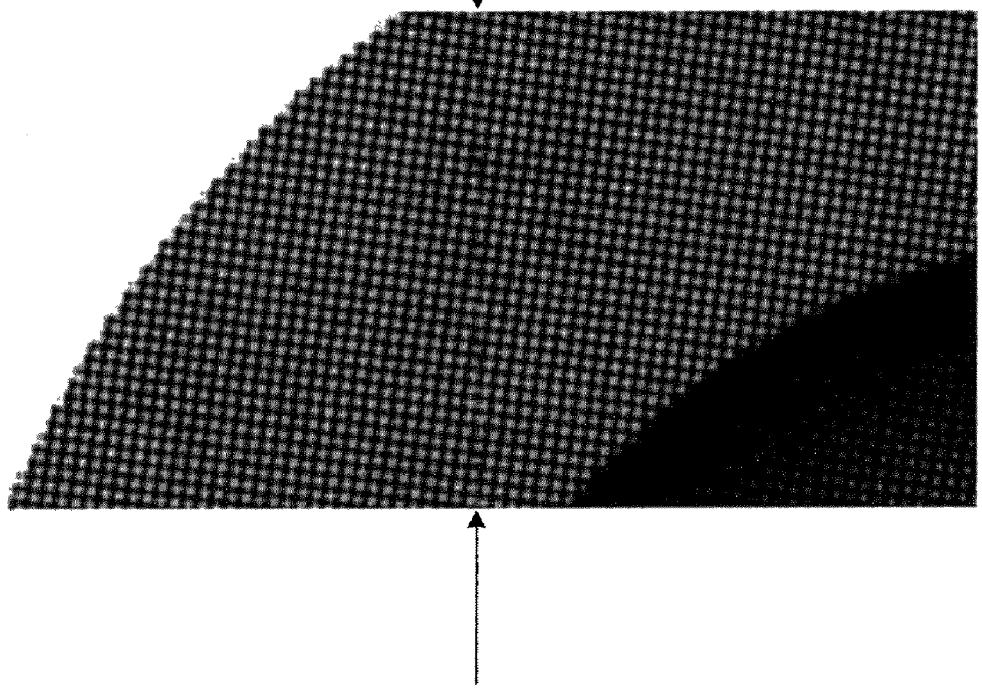
FIG. 14 illustrates an explanatory view showing an example of a screen image in which the missing pixel has been interpolated only by a one-dimensional direction interpolation.

FIG. 11 illustrates an example of the screen image in which the interpolation of the missing pixel has been performed by the pixel interpolation processor 30. There was the affected streak caused by the conventional interpolation method in the missing pixel "A" section of the image illustrated in FIG. 14. However, the affected steak does not exist in the screen image of FIG. 11. The pre-estimation value is corrected so that the image has natural connections of density.

Thus, the interpolation processing in one-dimension determines the pre-estimation value $D_{PM}$ of each missing pixel. This pre-estimation value $D_{PM}$ is used for a temporary density value of the missing pixel. Each pre-estimation value $D_{PM}$ is corrected so that the density averages of the first two-dimensional area "F" that contains the missing pixel and the second two-dimensional area "G" that does not contain the missing pixel equals or equals approximately with each other. Therefore, even in case when the missing pixel in the screen image processed in the two-dimensional screen pattern is interpolated, the missing pixel can be interpolated so that the image has natural connections of density without the generation of moire and a streak.

Namely, with respect to each missing pixel, after calculating the pre-estimation value being a probable density value to a certain degree and using this pre-estimation value as a provisional density value of each missing pixel, the pre-estimation value is corrected so that the average values of the density of the first two-dimensional area "F" and the second two-dimensional area "G" equal to each other. Therefore, a plurality of missing pixels can be set up into the area containing the missing pixels. In other words, the area containing a missing pixel can be made into a two-dimensional area. Even in case when the difference of the average values of the first two-dimensional area "F" that contains the missing pixels and the second two-dimensional area "G" that does not contain the missing pixels is equally distributed to the plurality of the missing pixels within the first two-dimensional area "F", a peculiar characteristic remains on each missing pixel. That is, the density of each missing pixel is expressed with the total of the correction value and the pre-estimation value, which were distributed equally. The pre-estimation value of each of the missing pixels is individually obtained from one-dimensional interpolation by the pre-interpolation section 31. Therefore, the pre-estimation value is corrected so that the feature of the density of each missing pixel obtained from the one-dimensional interpolation is kept and reflected even after the pre-estimation value has been added, and so that the density unevenness disappears when viewed in two-dimensional area.

Second Embodiment

Figure 12:
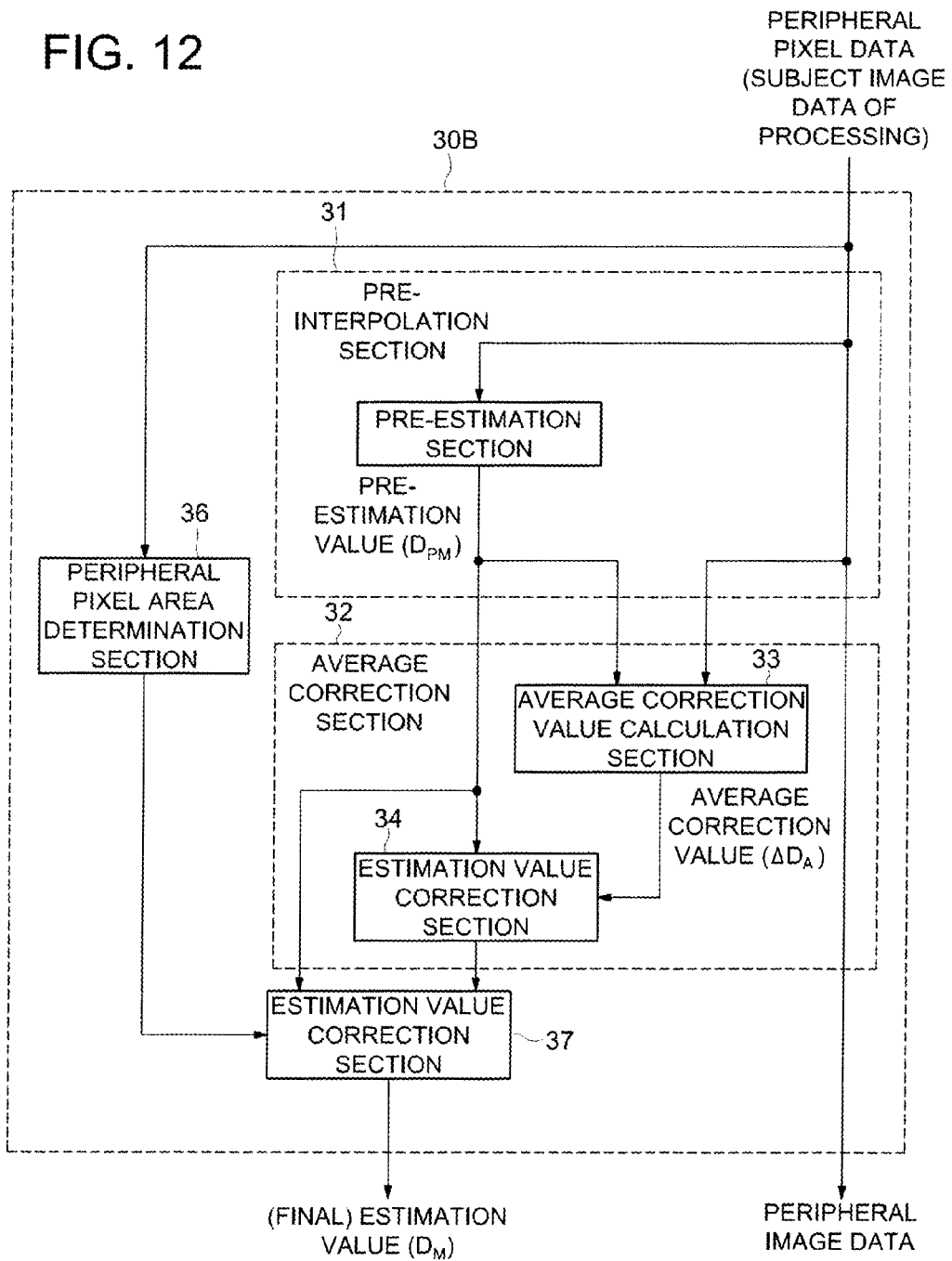
FIG. 12 illustrates a block diagram of a configuration of the pixel interpolation processor pertaining to a second embodiment of the present invention.
Figure 13A:
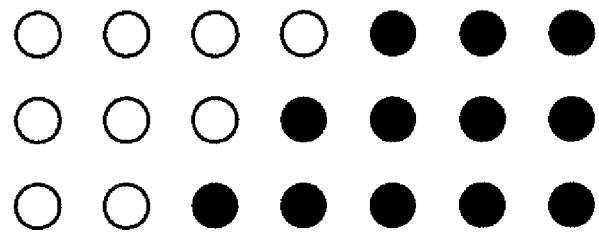
FIGS. 13a-c illustrate explanatory views showing examples of an image having missing pixels, an image with missing pixels and an image in case when the missing pixels are interpolated.
Figure 13B:
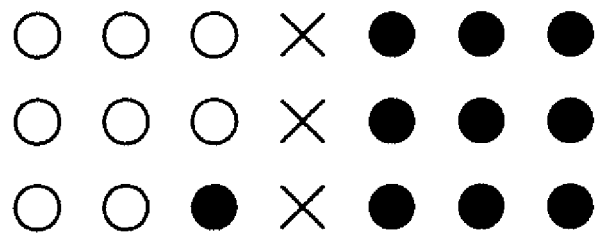
Figure 13C:
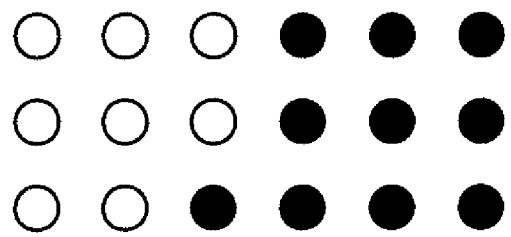

FIG. 12 illustrates a configuration of a pixel interpolation processor 30B pertaining to a second embodiment of the present invention. In addition to the pixel interpolation processor 30 illustrated in the first embodiment of the present invention, the pixel interpolation processor 30B is configured by a peripheral pixel area determination section 36 and an interpolation method selection section 37. The configurations and the operations of the pre-interpolation section 31 and the average correction section 32 and the other configuration as the digital multi function peripheral 10 are the same as that of the first embodiment of the present invention. Thus, the description will be omitted.

The interpolation processing that uses the pre-interpolation section 31 and the average correction section 32 is effective to the screen image, as mentioned above. Therefore, the peripheral pixel area determination section 36 performs area determination of the peripheral pixel data. The peripheral pixel area determination section 36 determines whether there is a missing pixel that needs to be interpolated in a screen image area or in any other image area or not. The method for determining an area may be an arbitrary method, such as a method used conventionally.

The pre-estimation value outputted by the pre-interpolation section 31, the estimation value after the correction outputted by the average correction section 32 and the signal indicating the result of the area determination outputted by the peripheral pixel area determination section 36 are inputted in the interpolation method selection section 37. In case when the determination result inputted from the peripheral pixel area determination section 36 indicates that the missing pixel exists in the screen image area, the interpolation method selection section 37 selects the estimation value after the correction inputted from the average correction section 32. In other cases, the interpolation method selection section 37 selects the pre-estimation value inputted from the pre-interpolation section. The selected value is used as a final interpolation value (final estimation value) against the missing pixels.

In such case when the missing pixel is in the screen image area, the estimation value after the correction outputted by the average correction section 32 is used for the interpolation value. In case when the missing pixel is in the area other than the screen image area, the pre-estimation value generated by the pre-interpolation section 31 is used for the interpolation value. Therefore, the missing pixel can be appropriately interpolated in correspondence to each area.

As described above, the various embodiments of the present invention have been described using the drawings. However, a concrete configuration is not limited to what was illustrated in the embodiments. The present invention includes embodiments onto which a change or an addition that does not deviate from the scope of the present invention may be made.

For example, although the first two-dimensional area "F" was set up as a square matrix area of 3×3 pixels in the embodiment, 4×4, 5×5 and other size or a form other than a square matrix may be possible. The first two-dimensional area "F" that contains the missing pixel only needs to contain the targeted missing pixel in the area. For example, the missing pixel may be set up on either end of the area. The area that does not contain the missing pixel may be in an arbitrary form as long as the area does not contain the missing pixel and exists in the peripheral of the missing pixel. In the embodiment, although the second two-dimensional area "G" has been divided into the area $G_L$ and the area $G_R$ on the left side and the right side of the missing pixels so as to sandwich the missing pixels, the area may be one area. The first two-dimensional area "F" and the second two-dimensional area "G" may be different sizes or the same size. In conclusion, the missing pixel may be corrected so that the average densities of the two-dimensional area that contain the missing pixel and the peripheral two-dimensional area that does not contain the missing pixel equal with each other. Therefore, the form and size of each two-dimensional area may be arbitrary.

According to the embodiment of the present invention, the pre-estimation value of the missing pixel has been corrected so that the average density (first average value) of the first two-dimensional area "F" and the average density (second average value) of the second two-dimensional area "G" equal with each other. This is a desirable mode. However, the present invention is not limited to this. The pre-estimation value needs to be corrected so that the difference between the first average value and the second average value becomes little. Thus, a proper effect can be acquired.

What is claimed is:

1. A pixel interpolation apparatus comprising:
   an interpolation section for calculating an estimation density value of a missing pixel from densities of peripheral pixels of the missing pixel; and
   a correction section for calculating a first average value which being an average density value of pixels in a first two-dimensional area containing the missing pixel whose density value is assumed to be the estimation density value calculated by the interpolation section and a second average value which being an average density value of a second two-dimensional area, located in a peripheral of the missing pixel, not containing the missing pixel, and for correcting the estimation density value of the missing pixel in the first two-dimensional area so that a difference between the first average value and the second average value becomes zero or small.

2. The pixel interpolation apparatus of claim 1 further comprising:
   a determination section for determining whether a peripheral area of the missing pixel is a screen image area,
   wherein, with respect to the missing pixel whose peripheral area has been determined to be the screen image area by the determination section, a corrected value obtained in the correction section by correcting the estimation density value calculated by the interpolation section is set to be a density value of the missing pixel, and with respect to the missing pixel whose peripheral has been determined not to be the screen image area by the determination section, the estimation density value calculated in the interpolation section is set to be the density value of the missing pixel.

3. The pixel interpolation apparatus of claim 1, wherein position information indicating a position where the missing pixel exists in a subject image is given in advance.

4. The pixel interpolation apparatus of claim 1, wherein the interpolation section calculates the estimation density value of the missing pixel using the density values of the peripheral pixels in a one-dimensional direction of the missing pixel.

5. The pixel interpolation apparatus of claim 1 wherein, the correction section is further configured to multiply the difference between the first average value and the second average value by a pixels number contained in the first two-dimensional area to get a multiplied value, to distribute the multiplied value onto one or a plurality of missing pixels in the first two-dimensional area, and to add the distributed value onto the estimation density value of the missing pixel where the multiplied value is distributed, as an operation to correct the estimation density value of the missing pixel in the first two-dimensional area so that the difference between the first average value and the second average value becomes zero or small.

6. An image reading apparatus comprising:
   a reading section having a line image sensor in which a plurality of sensor chips are arranged in series to have a reading area corresponding to a plurality of pixels aligned in one-dimensional prescribed direction, and at a boundary of each one and the another of the plurality of sensor chips a missing pixel is generated, wherein the reading section optically reads a two-dimensional image of an original document by relatively moving the original document and the line image sensor; and
   a pixel interpolation apparatus for interpolate a missing pixel in image data obtained through reading the original document by the reading section, the pixel interpolation apparatus comprising, an interpolation section for calculating an estimation density value of the missing pixel from densities of peripheral pixels of the missing pixel, and a correction section for calculating a first average value which being an average density value of pixels in a first two-dimensional area containing the missing pixel whose density value is assumed to be the estimation density value calculated by the interpolation section and a second average value which being an average density value of a second two-dimensional area, located in a peripheral of the missing pixel, not containing the missing pixel, and for correcting the estimation density value of the missing pixel in a first two-dimensional area so that a difference between the first average value and the second average value becomes zero or small.

7. A pixel interpolation method comprising:

calculating an estimation density value of a missing pixel from densities of peripheral pixels of the missing pixel; and calculating a first average value which being an average density value of pixels in a first two-dimensional area containing the missing pixel whose density value is assumed to be the estimation density value calculated by the interpolation section, and a second average value which being an average density value of a second two-dimensional area, located in a peripheral of the missing pixel, not containing the missing pixel; and correcting the estimation density value of the missing pixel in the first two-dimensional area so that a difference between the first average value and the second average value becomes zero or small.

* * * * *